US008007025B2

(12) United States Patent
Köhr et al.

(10) Patent No.: US 8,007,025 B2
(45) Date of Patent: Aug. 30, 2011

(54) FASTENING DEVICE FOR HINGES OF A MOTOR VEHICLE DOOR

(75) Inventors: Robert Köhr, Neustadt (DE); Mario Schilling, Tamm (DE); Siegfried Walter, Leonberg (DE); Harald Gerber, Walheim (DE); Michael Dukat, Eisingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 170 days.

(21) Appl. No.: 12/468,083

(22) Filed: May 19, 2009

(65) Prior Publication Data

US 2010/0032988 A1 Feb. 11, 2010

(30) Foreign Application Priority Data

Aug. 7, 2008 (DE) ........................ 10 2008 036 868

(51) Int. Cl.
*B60R 7/00* (2006.01)

(52) U.S. Cl. .................................. 296/146.11; 296/202

(58) Field of Classification Search ............ 296/146.11, 296/202
See application file for complete search history.

(56) References Cited

U.S. PATENT DOCUMENTS

| | | | | |
|---|---|---|---|---|
| 5,624,150 | A * | 4/1997 | Venier | 296/146.11 |
| 6,267,437 | B1 * | 7/2001 | Morsch et al. | 296/193.06 |
| 6,698,821 | B2 * | 3/2004 | Racz | 296/202 |

FOREIGN PATENT DOCUMENTS

| | | | |
|---|---|---|---|
| DE | 91 06 938 | U1 | 10/1992 |
| DE | 44 43 816 | A1 | 6/1996 |
| DE | 199 58 148 | A1 | 6/2001 |

OTHER PUBLICATIONS

German Patent and Trademark Office Search Report, dated Aug. 7, 2008.

* cited by examiner

*Primary Examiner* — Joseph D Pape

(57) ABSTRACT

In a preassembly position, the hinge elements of the two hinges of the vehicle door are each connected fixedly to the vehicle door via a pivotable hinge element of the two hinges. The vehicle door is held in position with precise gap positioning in a side wall door cutout of the vehicle body. In a final assembly position, the positionally fixed hinge element of the two hinges is connected to outer and inner wall parts of a vehicle pillar of the vehicle body via fastening screws and via a torque strut.

8 Claims, 4 Drawing Sheets

FASTENING DEVICE FOR HINGES OF A MOTOR VEHICLE DOOR

CROSS-REFERENCE TO RELATED APPLICATION

This application claims the priority, under 35 U.S.C. §119, of German patent application DE 10 2008 036 868.7, filed Aug. 7, 2008; the prior application is herewith incorporated by reference in its entirety.

BACKGROUND OF THE INVENTION

Field of the Invention

The invention lies in the automotive field and relates, more specifically, to a fastening device for fastening the hinges of a motor vehicle door to the vehicle body. The hinge comprises two hinge elements, and the one hinge element is fastened in a positionally fixed manner to the vehicle body and the other hinge element is connected pivotably to the vehicle door German utility model DE 91 06 938.6 U1 describes a hinge fastening for motor vehicle doors on the vehicle body. The hinge fastening comprises a hinge with two hinge wings which are connected to each other pivotably via a hinge pin, with the one hinge wing being fastened to the vehicle door and the other hinge wing being fastened to a vehicle pillar. An alignment of the pivot axis of the hinges and therefore of the door in the door cutout of the vehicle body takes place by deformation of a hinge wing with the aid of the door as a lever arm.

SUMMARY OF THE INVENTION

It is accordingly an object of the invention to provide a fastening device for fastening hinges of a motor vehicle door to the vehicle body which overcomes the above-mentioned disadvantages of the heretofore-known devices and methods of this general type and in which the motor vehicle door is held in a manner positioned with an optimum gap profile or join profile in the side wall door cutout of the motor vehicle via the hinges.

With the foregoing and other objects in view there is provided, in accordance with the invention, a fastening device for fastening hinges of a motor vehicle door to a vehicle body, the vehicle body having a side wall door cutout and a vehicle body pillar. The door is fastened by at least two hinges each including a first hinge element fastened in a positionally fixed manner to the vehicle body and a second hinge element connected pivotally with the vehicle door; and fastening screws and a torque strut for fastening said first hinge element to the vehicle body; and in a preassembly position, said first and second hinge elements of said hinges are connected fixedly to the vehicle door via said second hinge element and the vehicle door is held with precise gap positioning in the side wall door cutout of the vehicle body; and in a final assembly position, said first hinge element of said hinges is connected to outer and inner wall parts of the vehicle pillar of the vehicle body via said fastening screws and said torque strut.

The advantages primarily obtained with the invention consist in that the motor vehicle door can be inserted in a side wall door cutout of the vehicle body via the two connected hinges and can be connected to the vehicle body via the hinges in such a manner that an optimum join profile or gap profile is produced all the way around between the door and side wall door cutout. This is achieved according to the invention by, in a preassembly position, the hinge elements of the two hinges of the vehicle door being each connected fixedly to the vehicle door via the pivotable hinge element of the hinges and by said vehicle door being held in a manner such that it is positioned precisely in terms of joins—referred to herein as "gap positioning"—in the side wall door cutout of the vehicle body, wherein, in a final assembly position, the positionally fixed hinge element of the two hinges is connected to at least one outer and one inner wall part on the vehicle pillar of the vehicle body via fastening screws and a torque strut. Therefore, during the process of manufacturing the vehicle, before the door is inserted, for example using a robot, the side wall door cutout can be measured and then the door can be positioned via the robot so as to provide an optimum join profile and for the fastening of the positionally fixed hinge elements to the vehicle pillar.

In order to fix the positionally fixed hinge element of each hinge, it is furthermore provided according to the invention that at least two embedded fastening screws are held in a hinge plate of the positionally fixed hinge element of the hinges, and the torque strut protrudes with respect to the hinge plate in the region between said fastening screws. In the final assembly position, said hinge plate bears against at least one outer wall part of the vehicle pillar, and a free end of the torque strut is connected to at least one inner wall part of the vehicle pillar with a cohesive material joint (e.g., weld, braze, solder, glue, etc.). So that the fastening screws of the hinges and the torque strut can be positioned appropriately when the door is fitted into the side wall door cutout, the outer wall parts of the vehicle pillar have premanufactured openings for the passage of the corresponding fastening screws and of the torque strut of the positionally fixed hinge element of the two hinges in the final assembly position. The openings are designed with an encircling play with respect to the fastening screws and with respect to the torque strut in such a manner that the vehicle door can be inserted in a manner adjusted precisely in terms of joins by means of the positionally fixed hinge element of the two hinges. The effect achieved by this is that the vehicle door can easily be adjusted in the side wall door cutout in order to obtain the optimum door joins.

The handling in order to fix the fastening screws to outer wall parts of the vehicle pillar takes place through an opening in at least one inner wall part of the vehicle pillar, through which opening the screw nuts and, for example, a handling tool can be inserted.

Furthermore, a cohesive material connection of the torque strut to at least one inner wall part can take place through an opening or through a plurality of openings located one above another in other wall parts.

According to a further refinement of the invention, the torque strut can be arranged in a floating manner with respect to at least one inner wall part of the vehicle pillar and can be connected to said wall part with a cohesive material joint.

By means of the insertion of the fastenings of the positionally fixed hinge element according to the invention, it is possible in a simple manner in terms of assembly to insert the door into the side wall door cutout precisely in terms of joins by the hinges being fastened in preassembled form via the pivotable hinge element to the vehicle door, and by the vehicle door being held in a manner such that it is positioned with an identical encircling join profile in the side wall door cutout, and by, in said preassembly position, the two hinges being screwable to the vehicle pillar and the torque strut being weldable to the vehicle pillar via the positionally fixed hinge element.

Other features which are considered as characteristic for the invention are set forth in the appended claims.

Although the invention is illustrated and described herein as embodied in a fastening device for hinges of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
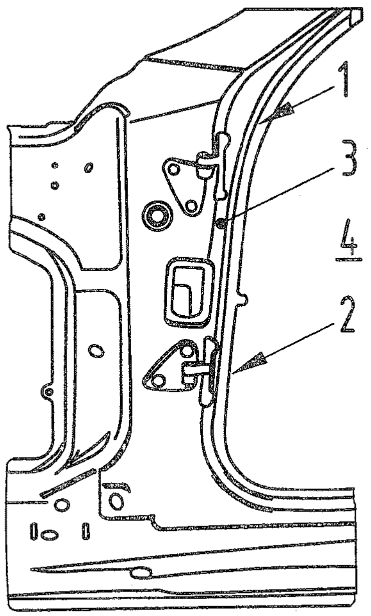
FIG. 1 shows a diagrammatic illustration of two hinges arranged one above the other on a vehicle pillar with fastening screws and a torque strut.
Figure 2:
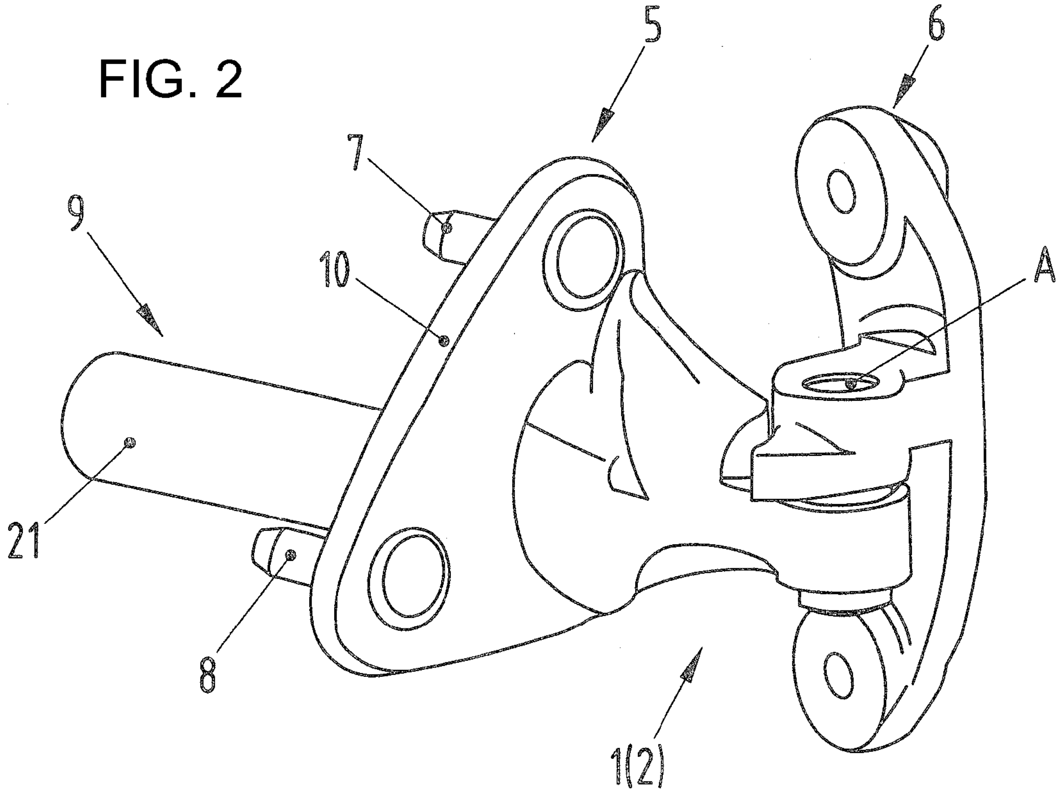
FIG. 2 shows a diagrammatic illustration of a hinge with two hinge elements connected via a pivot axis.

Referring now to the figures of the drawing in detail and first, particularly, to FIGS. 1 and 2 thereof, a vehicle door is pivotally mounted in a side wall door cutout 4 of a vehicle body of a motor vehicle by way of hinges 1 and 2, which are arranged one above the other, in the region of a vehicle pillar 3. Each of the hinges 1, 2 comprises two hinge elements 5 and 6 which are connected pivotably to each other via a pin A. The one hinge element 5 is connected in a positionally fixed manner to at least one inner and one outer wall part W1 and W of the vehicle pillar 3 via fastening screws 7, 8 and a torque strut 9. The other pivotable hinge element 6 is connected fixedly to the vehicle door via screw means. In a preassembly position, the two hinges 1 and 2, comprising the two hinge elements 5 and 6, are connected fixedly to the vehicle door. In order to fasten the positionally fixed hinge element 5 which is to be connected to the vehicle pillar 3, the door is positioned in a side wall door cutout 4 in such a manner that there is an optimum join profile all the way around. For this purpose, in the manufacturing process, the side wall door cutout is measured in advance and then the door is appropriately inserted into the side wall door cutout 4 using a robot. If the join profile is correct, the hinge elements 5 of the two hinges 1 and 2 are screwed to the vehicle pillar 3 via the fastening screws 7, 8 and are welded to the torque strut 9.

When the hinge element 5 of the hinges 1 and 2 is fitted onto the vehicle pillar 3, the fastening screws 7, 8—which are arranged embedded in a hinge plate 10—are inserted through premanufactured openings 11, 12 and 11*a*, 12*a* in the vehicle pillar. The torque strut 9 of the hinges 1, 2 is likewise arranged on the hinge plate 10 and protrudes through a further premanufactured opening 14, 14*a* in the vehicle pillar 3. Said openings 11, 12 and 11*a*, 12*a* and 14, 14*a* are each provided with an encircling play 15, 16 and 17 with respect to the fastening screws 7, 8 and with respect to the torque strut 9, i.e. the diameters of the openings are larger than those of the fastening screws and that of the torque strut 9. This is required so that the door can be adjusted in the side wall door cutout in a manner corresponding to an optimum join profile.

Figure 4:
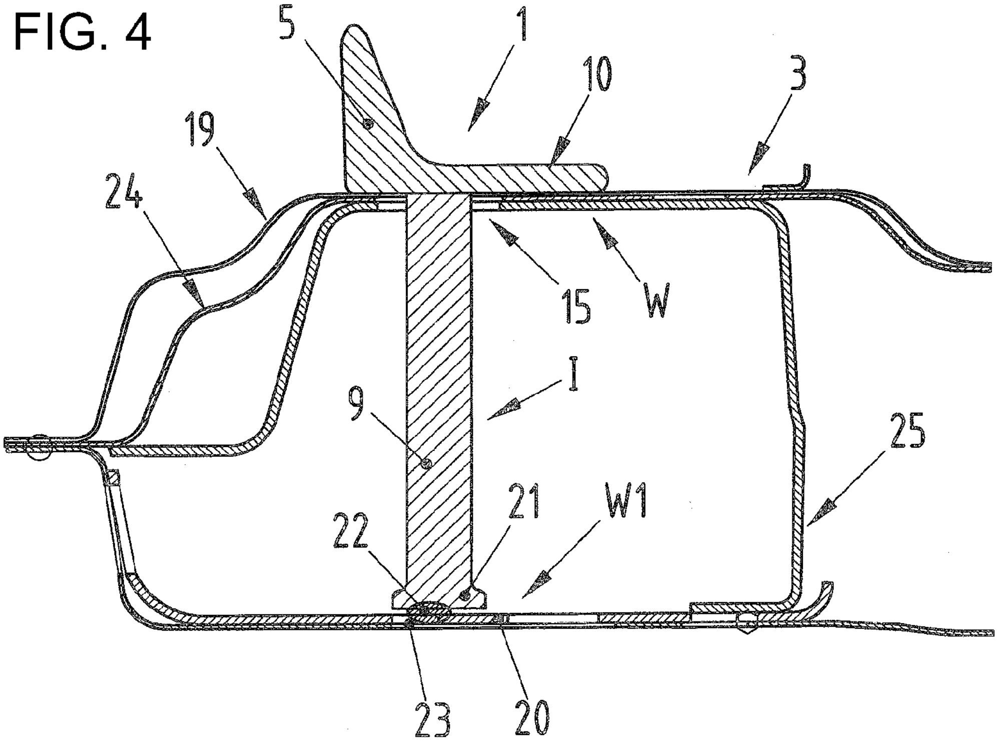
FIG. 4 shows a horizontal section through the vehicle pillar in the region of an upper hinge along the line IV-IV of FIG. 3.
Figure 5:
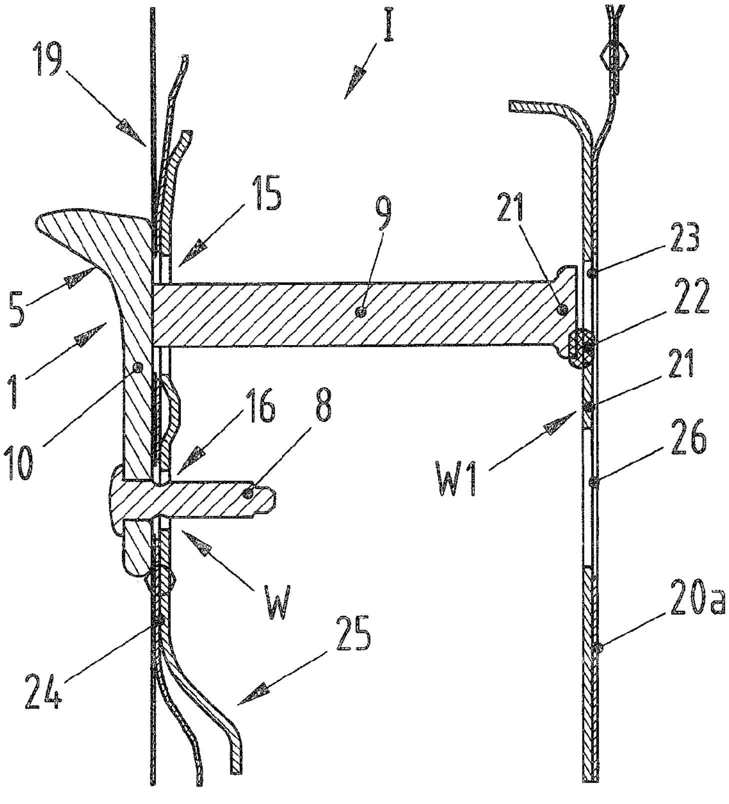
FIG. 5 shows a vertical section through the vehicle pillar in the region of the upper hinge along the line V-V of FIG. 3.

As illustrated in more detail in FIGS. 4 and 5 by reference to the upper door hinge 1, the hinge plate 10 bears against outer wall parts W or against a wall part 19 and against a reinforcing wall 24, and the torque strut 9 protrudes through the vehicle pillar 3 as far as inner wall parts W1 or a wall 20. The free end 21 of the torque strut 9 can be arranged in a floating manner with respect to the wall part and is connected via a weld 22 to at least one inner wall part W1, or to a wall part 20 or a wall part 20*a*. The weld 22 is undertaken through an opening 23 in the wall part 20.

The fastening screws 7, 8 of the hinges 1, 2 are fixed in the hinge plate 10 and are connected at outer wall parts W or a wall 10 to reinforcing walls 24 and 25 by means of screw nuts which are placed onto them. Said screw nuts are inserted by means of a handling tool through an opening 26 in the outer wall part W.

Figure 3:
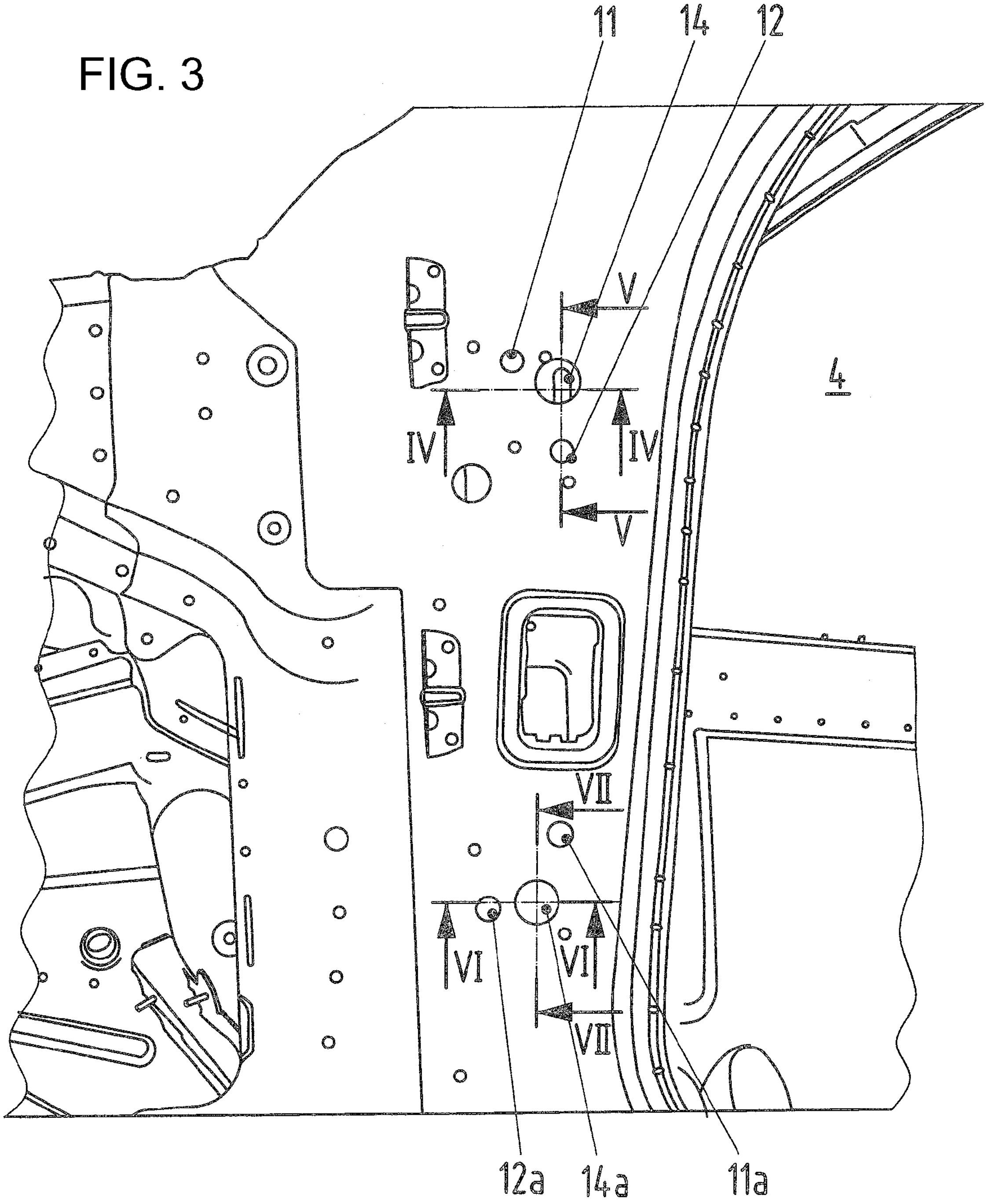
FIG. 3 shows a view of a vehicle pillar with two receiving openings for the fastening screws of the hinges and with a receiving opening for the torque strut.
Figure 6:
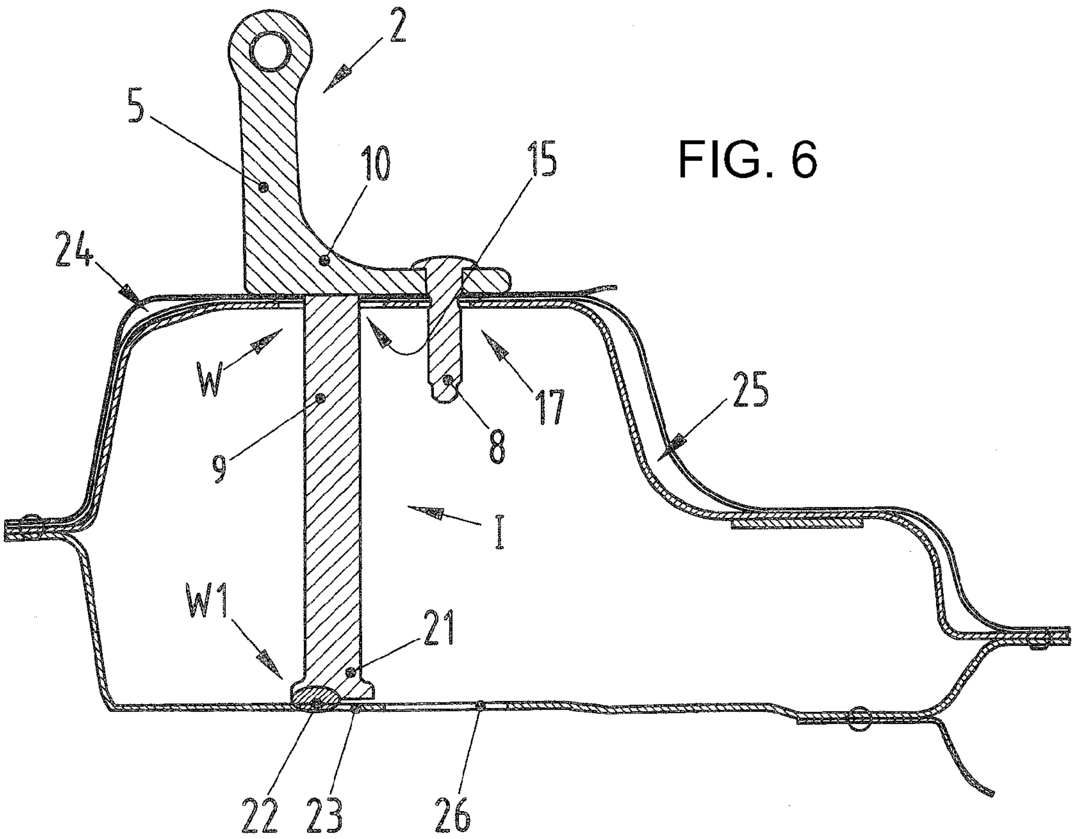
FIG. 6 shows a horizontal section through the vehicle pillar in the region of a lower hinge along the line VI-VI of FIG. 3.
Figure 7:
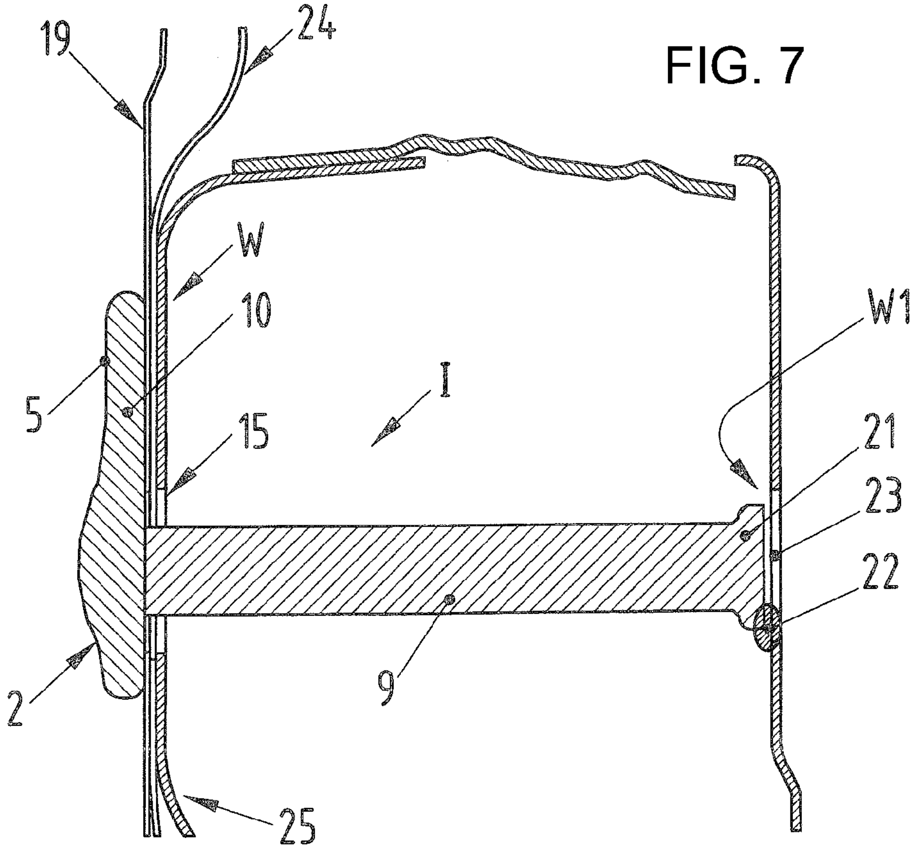
FIG. 7 shows a vertical section through the vehicle pillar in the region of the lower hinge along the line VII-VII of FIG. 1.

FIGS. 6 and 7 show the lower door hinge 2 which is designed in a manner corresponding to the upper door hinge 1 and is connected to the vehicle pillar 3 and to the door. In contrast to the openings 11*a*, 12*a* for the fastening screws 7, 8 of the lower hinge 2, the openings 11, 12 for the fastening screws 7, 8 of the upper hinge are arranged in such a manner that the opening 11 according to FIG. 3 is arranged—as seen in the side view—to the left of the opening for the torque strut 9 and the corresponding opening 11*a* is arranged to the right of the opening 14*a* for the torque strut 9.

The invention claimed is:

1. A fastening device for fastening hinges of a motor vehicle door to a vehicle body, the vehicle body having a side wall door cutout and a vehicle body pillar with outer and inner wall parts, comprising:

- at least two hinges each including a first hinge element fastened in a positionally fixed manner to the vehicle body and a second hinge element connected pivotally with the vehicle door;
- fastening screws and a torque strut for fastening said first hinge element to the vehicle body, said torque strut disposed directly on said first hinge element and extending uninterrupted from said first hinge element to the inner wall part;
- said first hinge element of said at least two hinges having a hinge plate holding at least two of said fastening screws embedded in said hinge plate and said torque strut protruding with respect to said hinge plate in a region between said at least two fastening screws;
- wherein:
- in a preassembly position, said first and second hinge elements of said at least two hinges are connected fixedly to the vehicle door via said second hinge element and the vehicle door is held with precise gap positioning in the side wall door cutout of the vehicle body; and
- in a final assembly position, said first hinge element of said at least two hinges is connected to the outer and inner wall parts of the vehicle pillar of the vehicle body via said fastening screws and said torque strut.

2. The fastening device according to claim 1, wherein, in the final assembly position, said hinge plate bears against the outer wall part of the vehicle pillar, and a free end of said torque strut is connected to the inner wall part of the vehicle pillar with a cohesive material joint.

3. A fastening device for fastening hinges of a motor vehicle door to a vehicle body, the vehicle body having a side wall door cutout and a vehicle body pillar with outer and inner wall parts, comprising:

at least two hinges each including a first hinge element fastened in a positionally fixed manner to the vehicle body and a second hinge element connected pivotally with the vehicle door;

fastening screws and a torque strut for fastening said first hinge element to the vehicle body, said torque strut disposed directly on said first hinge element and extending uninterrupted from said first hinge element to the inner wall part;

in a preassembly position, said first and second hinge elements of said at least two hinges are connected fixedly to the vehicle door via said second hinge element and the vehicle door is held with precise gap positioning in the side wall door cutout of the vehicle body;

in a final assembly position, said first hinge element of said at least two hinges is connected to the outer and inner wall parts of the vehicle pillar of the vehicle body via said fastening screws and said torque strut; and the outer wall parts of the vehicle pillar are formed with premanufactured openings for receiving said fastening screws, which are disposed in a corresponding configuration, and said torque strut in the final assembly position.

4. The fastening device according to claim 3, wherein said openings are formed with a greater diameter than a diameter of said fastening screws and a diameter of said torque strut, respectively, to allow the vehicle door to be inserted into the side wall door cutout with precise gap positioning by means of said first hinge element of the at least two hinges being positionally fixed.

5. The fastening device according to claim 1, wherein said fastening screws are configured to be fixed through openings in the inner wall part by way of a handling tool that can be passed therethrough.

6. The fastening device according to claim 1, wherein a cohesive material connection of said torque strut to the inner wall part is formed through an opening in at least one outer wall part.

7. The fastening device according to claim 1, wherein said torque strut is arranged in a floating manner with respect to the inner wall part of the vehicle pillar and is connected to the inner wall part with a cohesive material joint.

8. The fastening device according to claim 1, wherein said at least two hinges are fastenable in preassembled form via said second hinge element to the vehicle door, and wherein the vehicle door is held in position in the side wall door cutout via said first hinge element, and wherein, in the preassembly position, said at least two hinges can be screwed to the vehicle pillar and said torque strut is welded to the vehicle pillar.

* * * * *